(12) United States Patent
Dasar et al.

(10) Patent No.: US 10,747,706 B2
(45) Date of Patent: *Aug. 18, 2020

(54) SERVER EVENT LOG STORAGE AND RETRIEVAL SYSTEM

(71) Applicant: Dell Products L.P., Round Rock, TX (US)

(72) Inventors: Sundar Dasar, Round Rock, TX (US); Divya Vijayvargiya, Cedar Park, TX (US); Sanjay Rao, Austin, TX (US); Yogesh Prabhakar Kulkarni, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/438,151

(22) Filed: Jun. 11, 2019

(65) Prior Publication Data

US 2019/0294581 A1 Sep. 26, 2019

Related U.S. Application Data

(63) Continuation of application No. 15/659,890, filed on Jul. 26, 2017, now Pat. No. 10,360,173.

(51) Int. Cl.
*G06F 13/42* (2006.01)
*G06F 13/40* (2006.01)
*G06F 3/06* (2006.01)

(52) U.S. Cl.
CPC .......... *G06F 13/4282* (2013.01); *G06F 3/067* (2013.01); *G06F 3/0613* (2013.01); *G06F 3/0647* (2013.01); *G06F 13/4081* (2013.01)

(58) Field of Classification Search
CPC ..... G06F 13/42; G06F 13/4282; G06F 3/0613
(Continued)

(56) References Cited

U.S. PATENT DOCUMENTS

| | | | |
|---|---|---|---|
| 6,772,099 B2 * | 8/2004 | Merkin | G06F 11/3006 700/52 |
| 9,183,106 B2 * | 11/2015 | Rao | G06F 11/3031 |

(Continued)

OTHER PUBLICATIONS

"Intel® System Event Log (SEL) Viewer Utility: User Guide," Document No. E12461-007, 20 Pages, http://www.intel.com/content/dam/support/us/en/documents/motherboards/server/s5400sf/sb/sel_viewer_user_guide.pdf.

*Primary Examiner* — Kamini B Patel
(74) *Attorney, Agent, or Firm* — Hayne and Boone, LLP

(57) ABSTRACT

Log storage and retrieval systems include a chassis housing a first motherboard with a first Serial Peripheral Interface (SPI) and a first remote access controller device located on the first motherboard and coupled to the first SPI. An off-motherboard SPI storage device is connected to the first SPI, and when the first remote access controller device determines that log entries have been generated, it automatically copies the log entries to the off-motherboard SPI storage device via the first SPI. A second motherboard includes a second SPI that couples to the off-motherboard SPI storage device when the second motherboard replaces the first motherboard in the chassis. A second remote access controller device located on the second motherboard and coupled to the second SPI will then retrieve the log entries that were automatically copied to the off-motherboard SPI storage device, and send the log entries through a network to a support device.

20 Claims, 6 Drawing Sheets

(58) Field of Classification Search
USPC .......................................................... 714/15
See application file for complete search history.

(56) References Cited

U.S. PATENT DOCUMENTS

| | | | | |
|---|---|---|---|---|
| 10,148,533 | B1* | 12/2018 | Hull | H04L 43/04 |
| 10,152,432 | B1* | 12/2018 | Dasar | G06F 13/102 |
| 10,360,173 | B2* | 7/2019 | Dasar | G06F 13/4282 |
| 2009/0150691 | A1* | 6/2009 | Chen | G06F 1/3209 |
| | | | | 713/310 |
| 2013/0290787 | A1* | 10/2013 | Chen | H04L 43/0817 |
| | | | | 714/37 |
| 2016/0179704 | A1* | 6/2016 | Berke | G06F 12/1441 |
| | | | | 711/163 |
| 2016/0203159 | A1* | 7/2016 | Tran | G06F 16/178 |
| | | | | 707/620 |
| 2016/0342795 | A1* | 11/2016 | Sharpless | G06F 21/57 |
| 2017/0010884 | A1* | 1/2017 | Liu | G06F 8/66 |
| 2017/0083390 | A1* | 3/2017 | Talwadker | G06F 11/0748 |
| 2017/0083425 | A1* | 3/2017 | Huang | G06F 11/3031 |
| 2017/0220663 | A1* | 8/2017 | Zhao | G06F 16/35 |
| 2018/0091393 | A1* | 3/2018 | He | H04L 43/065 |
| 2018/0357425 | A1* | 12/2018 | Swaminathan | G06F 21/552 |

* cited by examiner

SERVER EVENT LOG STORAGE AND RETRIEVAL SYSTEM

CROSS-REFERENCE TO RELATED APPLICATIONS

This is a Continuation application to U.S. Utility application Ser. No. 15/659,890 filed Jul. 26, 2017, entitled "SERVER EVENT LOG STORAGE AND RETRIEVAL SYSTEM," the disclosure of which is incorporated herein by reference in its entirety.

BACKGROUND

The present disclosure relates generally to information handling systems, and more particularly to the storage and retrieval of event logs from information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Some information handling systems generate event logs that provide a record of the alerts and/or notifications in the information handling system. For example, server devices may generate server event logs (SELs), and an entry in an SEL may be generated for any significant occurrence in the server device (or an application/program running on the server device) that requires a user of the server device to be notified or otherwise requires the entry to be added to the SEL. SEL entries may be classified by type (e.g., information events, warning events, error messages, success audit events, failure audit events, and/or other events known in the art), and may include a date of the event, a time of the event, a user logged in to the server device when the event occurred, an identifier for the server device, an event identifier that specifies the event type, a source of the event, and/or a variety of other SEL information known in the art. When available, SELs can be used by an administrator or customer support representative to identify and diagnose the source of existing problems in the server device, as well as possible future problems with the server device. SELs are typically viewed via an event viewer tool such as, for example, the WINDOWS® Event Viewer, a Command-Line tool such as wevtutil, and/or other event viewer tools known in the art.

However, in some situations, the SELs may not be available to an administrator or customer support representative. For example, when a motherboard in a server device fails or otherwise becomes unavailable (e.g., resulting in a device "hang", "crash", "hardware lockup", or other unavailability issue known in the art), there may be no capability to retrieve and view the SELs generated prior to that failure/unavailability. For example, a remote access controller on the failed/unavailable motherboard may be unreachable or unbootable, and the logs stored with that remote access controller may thus be unavailable as well (e.g., restart of the service processor in the remote access controller can be unpredictable when there is a hardware malfunction.) Furthermore, while this lack of SEL retrieval and viewing capability may be due to hardware/software issues like those discussed above, it may also occur due to privacy/security policies that prevent extraction of information from a motherboard that has been removed from a server device of a customer and replaced with a new motherboard. As such, an administrator or technical support representative is typically unable to view the SELs generated prior to motherboard failure/unavailability and/or removal/replacement, which limits the ability to detect and/or determine the issues that may have caused the failure/unavailability and/or resulted in the need to remove/replace that motherboard. As such, motherboards may be removed and replaced in situations where doing so may not necessarily be required, and identification of the issue that caused the failure/unavailability and/or removal/replacement may not be possible, or may take longer than it would if the SELs were available for analysis.

Accordingly, it would be desirable to provide an improved server event log storage and retrieval system.

SUMMARY

According to one embodiment, an Information Handling System (IHS) includes a motherboard that includes a Serial Peripheral Interface (SPI); a processing system that is located on the motherboard and coupled to the SPI; and a memory system that is located on the motherboard and coupled to the processing system, wherein the memory system includes instructions that, when executed by the processing system, cause the processing system to provide a remote access controller engine that is configured to: retrieve, subsequent to being connected to an off-motherboard SPI storage device via the SPI, at least one previously stored log entry that was automatically copied to the off-motherboard SPI storage device prior to the connection to the off-motherboard SPI storage device; send the at least one previously stored log entry through a network to a support device; determine, subsequent to sending the at least one previously stored log entry to the support device, that at least one current log entry has been generated; and automatically copy the at least one current log entry to the off-motherboard SPI storage device via the SPI.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
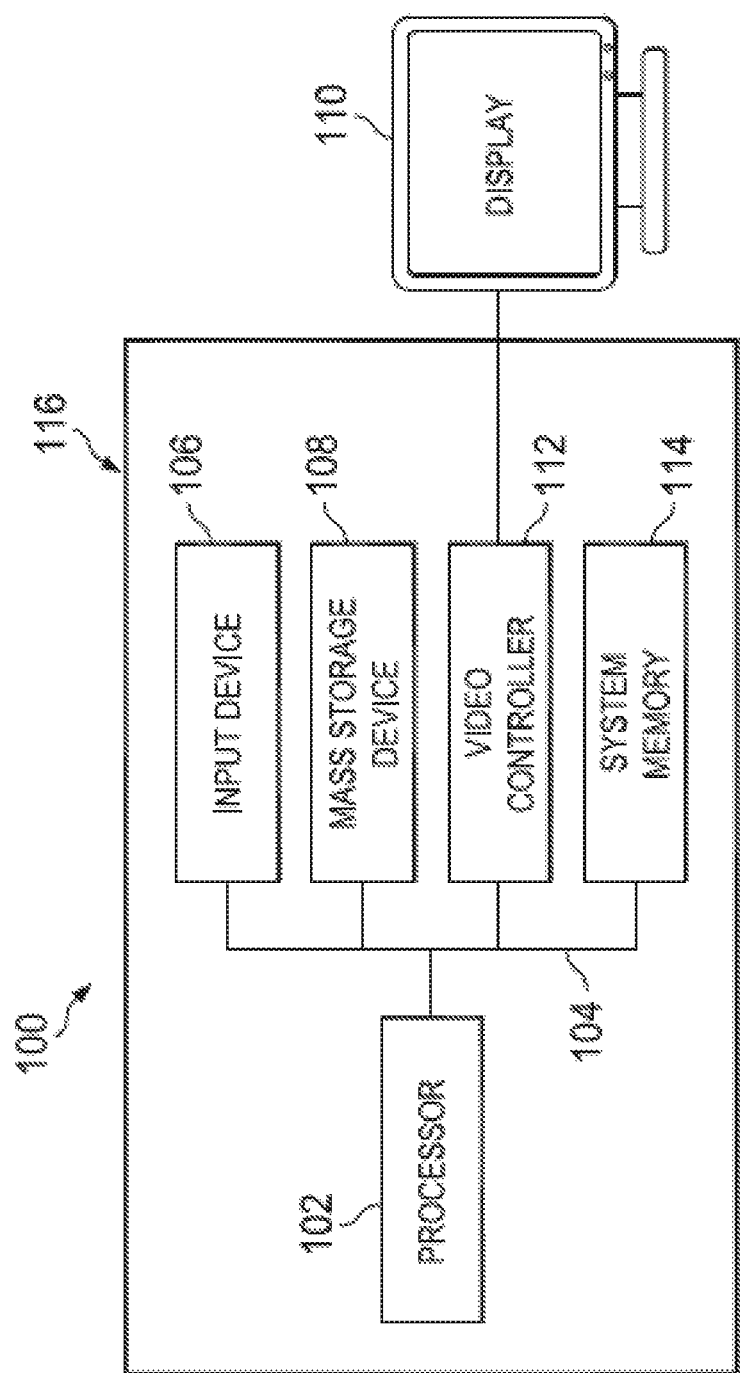
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
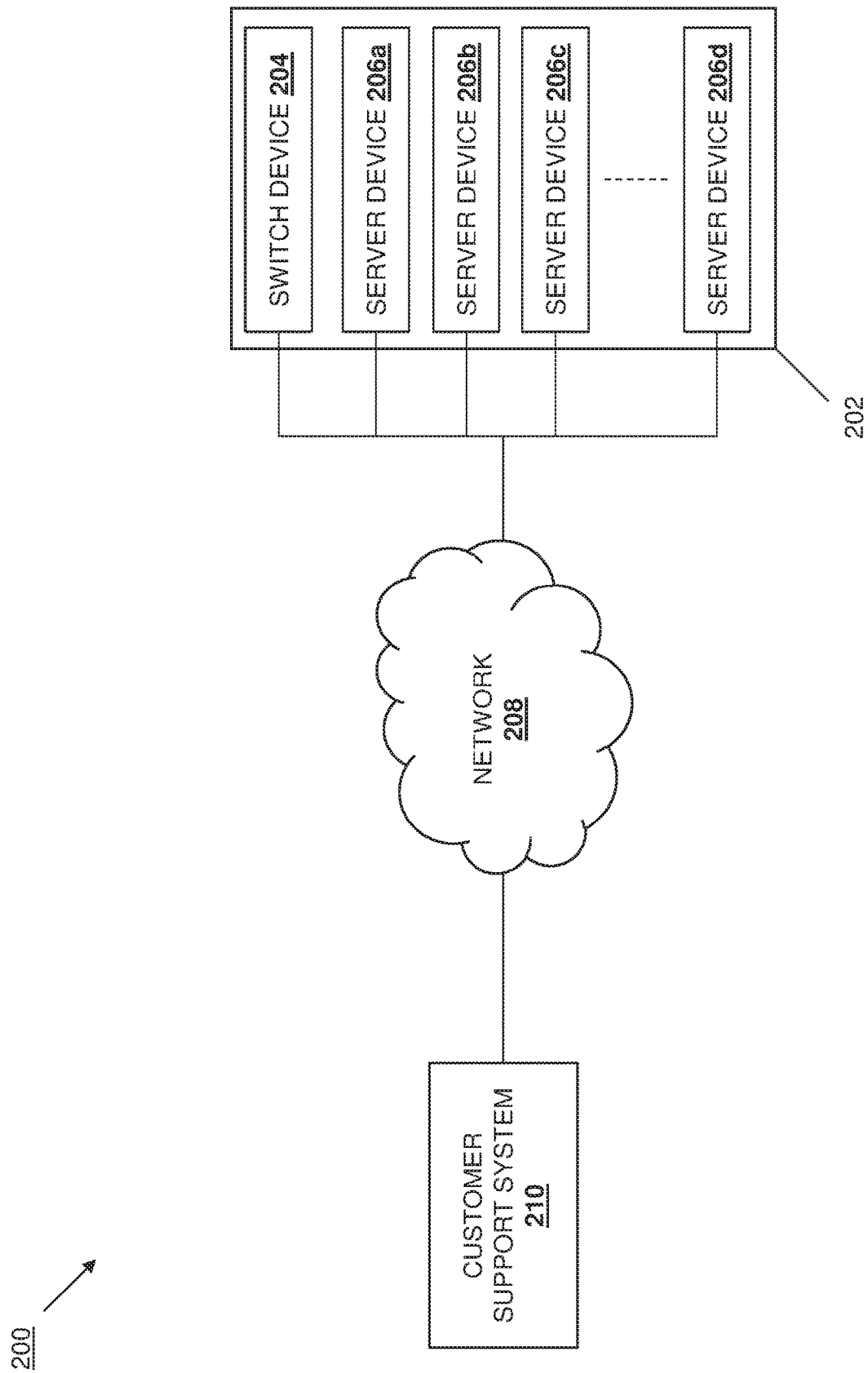
FIG. 2 is a schematic view illustrating an embodiment of an SEL storage and retrieval system.

Referring now to FIG. 2, an embodiment of a log storage and retrieval system 200 is illustrated. In the illustrated embodiment, the log storage and retrieval system 200 includes a rack 202 or other device chassis that houses a switch device 204 and a plurality of server devices 206a, 206b, 206c, and up to 206d. Any or all of the switch device 204 and the server devices 206a-d may be the IHS 100 discussed above with reference to FIG. 1, and/or may include some or all of the components of the IHS 100. However, while the specific embodiments discussed below include the device chassis housing switch devices and server devices, in other embodiments the device chassis may be omitted and/or devices other than switch devices and server devices may be utilized while remaining within the scope of the present disclosure. In the illustrated embodiment, each of the switch device 204 and the server devices 206a-d are coupled to a network 208. For example, any or all of the switch device 204 and the server devices 206a-d may include an out-of-band connection to the network 208. However, in other examples, any or all of the switch device 204 and the server devices 206a-d may include an in-band connection to the network 208 as well. Furthermore, in some examples, any or all of the server devices 206a-d may be connected to the network through the switch device 204. While a few examples have been provided, one of skill in the art in possession of the present disclosure will recognize that a variety of different network connections may be provided to the switch device 204 and/or the service device(s) 206a-d while remaining within the scope of the present disclosure. In the illustrated embodiment, a customer support system 210 is coupled to the network 208. In the examples below, the customer support system 210 may include one or more customer support devices that may be the IHS 100 discussed above with reference to FIG. 1, and/or may include some or all of the components of the IHS 100. However, one of skill in the art in possession of the present disclosure will recognize that customer support systems may be provided in a variety of manners that will remain within the scope of the present disclosure.

Figure 3:
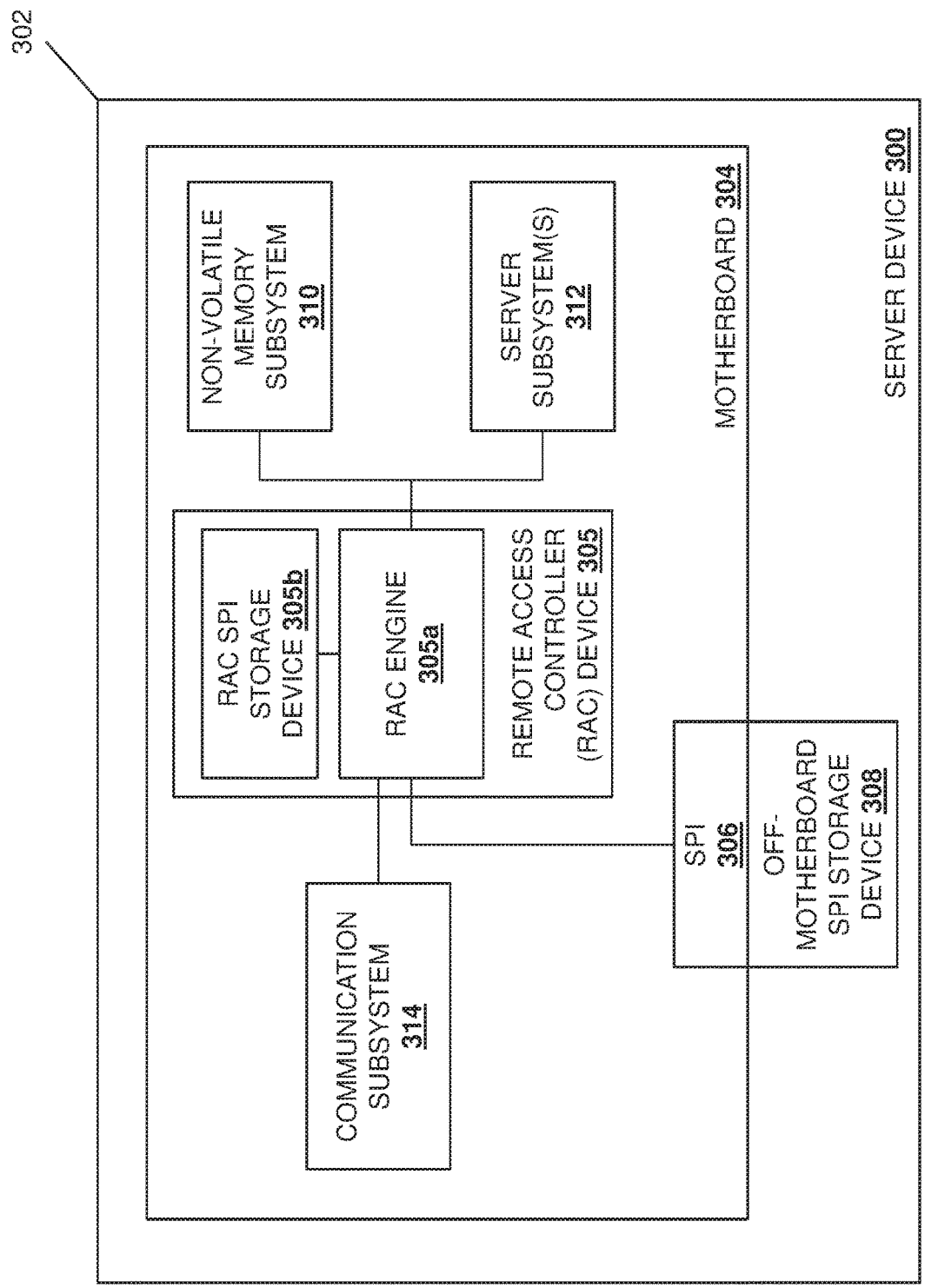
FIG. 3 is a schematic view illustrating an embodiment of a server device used in the SEL storage and retrieval system of FIG. 2.

Referring now to FIG. 3, an embodiment of a server device 300 is illustrated that may be any or all of the server devices 206a-d discussed above with reference to FIG. 2. As such, the server device 300 may be the IHS 100 discussed above with reference to FIG. 1, and/or may include some or all of the components of the IHS 100. In the illustrated embodiment, the server device 300 includes a chassis 302 that houses the components of the server device 300, only some of which are illustrated in FIG. 3. For example, the chassis 302 may house a motherboard 304 or other circuit board known in the art. In the illustrated embodiment, a remote access controller (RAC) device 305 is included on the motherboard 304. For example, the remote access controller device 305 may be an integrated Dell Remote Access Controller (iDRAC) available from DELL® Inc. of Round Rock, Tex., United States, although other remote access controllers will fall within the scope of the present disclosure as well. The remote access controller device 305 may include a RAC processing system (not illustrated, but which may include a processor similar to the processor 102 discussed above with reference to FIG. 1) and a RAC memory system (not illustrated, but which may include memory similar to the system memory 114 discussed above with reference to FIG. 1) including instructions that, when executed by the RAC processing system, cause the RAC processing system to provide a RAC engine 305a that is configured to perform the functions of the RAC engines and remote access controller devices discussed below. In the illustrated embodiment, the remote access controller 305 also includes a RAC Serial Peripheral Interface (SPI) storage device 305b that is coupled to the RAC engine 305a (e.g., via a coupling between the RAC SPI storage device 305b and the RAC processing system) that may be provided by, for example, a flash memory device or other storage devices known in the art. In some embodiments, the RAC SPI storage device 305b may be considered an "on-motherboard" SPI storage device due to the RAC SPI storage device 305b being part of the remote access controller device 304 that is integrated into the motherboard 305.

An SPI 306 is included on the motherboard 304 and coupled to the RAC engine 305a (e.g., via a coupling such as one or more traces between the RAC SPI storage device 305b and the RAC processing system.) One of skill in the art in possession of the present disclosure will recognize that the SPI 306 may be provided by a variety of SPI connectors and or SPI connections known in the art. An off-motherboard SPI storage device 308 is connected to the SPI 306. In an embodiment, the off-motherboard SPI storage device 308 may be a restore Serial Peripheral Interface (rSPI) card (sometimes referred to as a "front panel" SPI) that is available from DELL® Inc. of Round Rock, Tex., United States, although other off-motherboard SPI storage devices will fall within the scope of the present disclosure as well. The off-motherboard SPI storage device 308 may be considered "off-motherboard" due to the ability to connect it to, and disconnect it from, the SPI 306 such that it is located off the motherboard planar. For example, the rSPI card discussed above may be provided as a circuit board having an SPI connector that can be connected/disconnected with the SPI 306, and may include storage and other subsystems for providing the functionality discussed below.

In the illustrated embodiment, the server device 300 also includes a non-volatile memory subsystem 310 that is coupled to the motherboard 304 and the RAC engine 305a (e.g., via a coupling such as one or more traces between the memory subsystem connector(s) on the motherboard 304 and the RAC processing system.) For example, the non-volatile memory subsystem 310 may include one or more a Non-Volatile Dual Inline Memory Module (NVDIMM) devices, although other non-volatile memory subsystems will fall within the scope of the present disclosure as well. In the illustrated embodiment, the server device 300 also includes a one or more other server subsystem(s) 312 that may be included on or coupled to the motherboard 304 and the RAC engine 305a (e.g., via a coupling between that server subsystem and the RAC processing system.) For example, the server subsystem(s) 312 may include processing systems (e.g., central processing units (CPUs), network processing units (NPUs), etc.), memory systems, storage systems, display systems, and/or any other server subsystem that would be apparent to one of skill in the art in possession of the present disclosure. In the illustrated embodiment, the server device 300 also includes a communication subsystem 314 that is coupled to the motherboard 304 and the RAC engine 305a (e.g., via a coupling between the communication subsystem 314 and the RAC processing system.) For example, the communication subsystem 314 may include a Network Interface Controller (NIC), a wireless communication subsystem (e.g., a BLUETOOTH® communication subsystem, a Near Field Communication (NFC) subsystem, and/or other wireless subsystems known in the art, and may provide the connections between the switch device 206a/300 and the switch device 204, the other server devices 206b-d, and the network 208 discussed above with reference to FIG. 2. While the discussions below involve the server device 300, one of skill in the art in possession of the present disclosure will recognize that other devices may benefit from the teachings of the present disclosure and thus will fall within its scope. Furthermore, while a specific server device has been described, one of skill in the art in possession of the present disclosure will recognize that server devices may include a variety of components other than those illustrated in order to provide conventional server device functionality, as well as the functionality discussed below, while remaining within the scope of the of the present disclosure.

Figure 4:
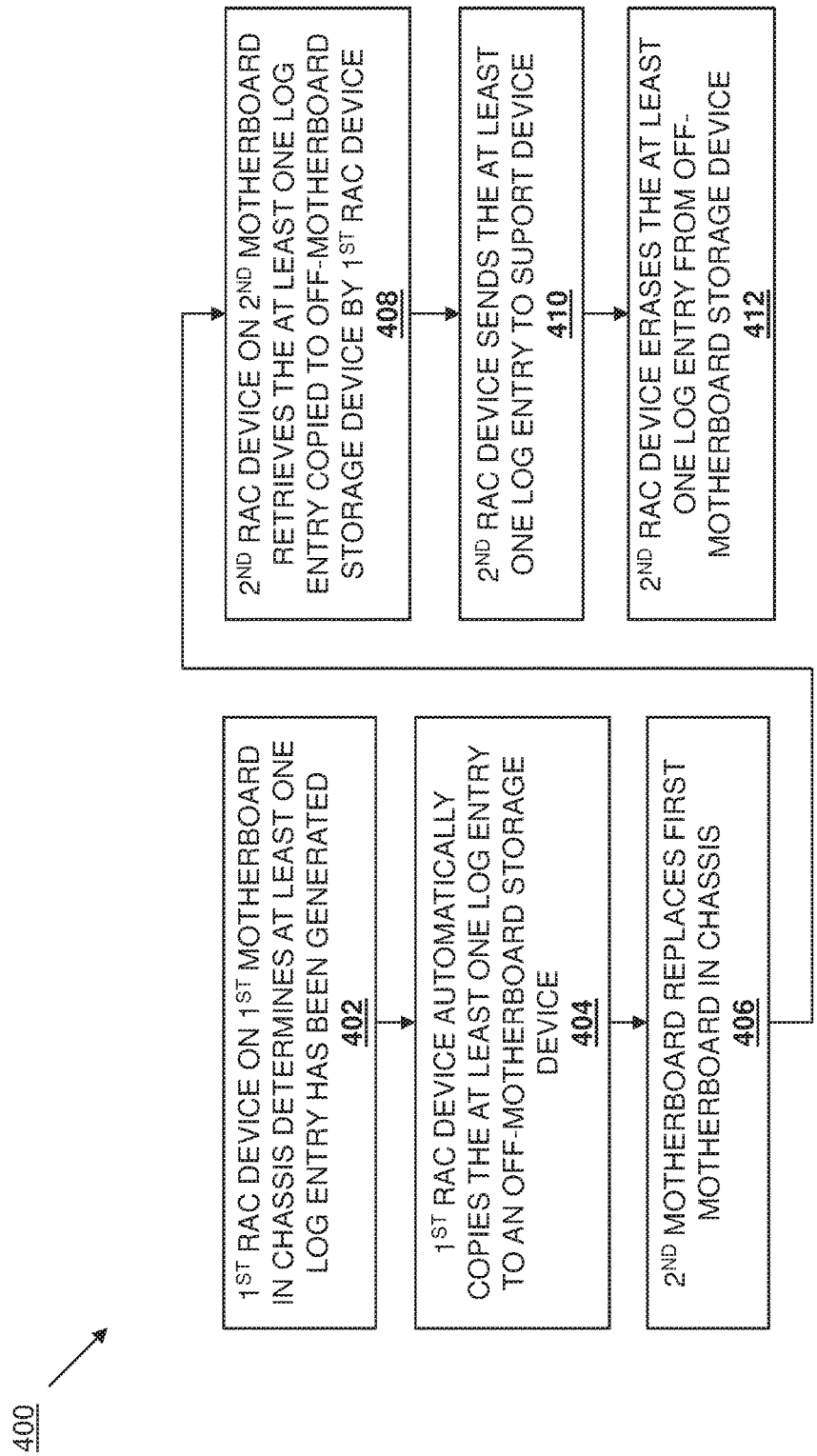
FIG. 4 is a flow chart illustrating an embodiment of a method for storing and retrieving SELs.

Referring now to FIG. 4, an embodiment of a method for log storage and retrieval is illustrated. As discussed below, embodiments of the systems and methods of the present disclosure provide for the automatic backing up of logs (e.g., server event logs (SELs)), which are generated while a first motherboard is in a chassis and coupled to components in the chassis, to an off-motherboard SPI storage device (e.g., an rSPI). In the event that first motherboard fails and/or becomes unavailable, the first motherboard may then be replaced with a second motherboard, and embodiments of the systems and methods of the present disclosure will provide for the retrieval of the previously stored logs from the off-motherboard SPI storage device, and the sending of those previously stored logs through a network to a support device. As such, when a first motherboard is replaced (e.g., with the second motherboard as discussed above) in a system due to failure and/or unavailability, that first motherboard may be sent to customer support representatives, who may then also view the SELs that were generated when that first motherboard was in the chassis (and, in many situations, right up to the time at which the first motherboard failed or became unavailable.) Thus, the analysis of the failure and/or unavailability issues with the first motherboard by the customer support representative is enhanced, providing for more efficient and accurate determinations of such issues, and in some cases the ability to address and/or remedy such issues in the future. Furthermore, in embodiments where an NVDIMM subsystem is present in the chassis and has available space, the logs and/or other critical collection information may be backed up to the NVDIMM subsystem, which allows a larger amount of information generated prior to the failure and/or unavailability of the motherboard to saved for later analysis by customer support representatives. In such embodiments, the critical collection information saved on the NVDIMM subsystem may be retrieved by removing the NVDIMM subsystem from the chassis and utilizing the NVDIMM subsystem with another computing system to obtain the critical collection information and, in some cases, provide it to the support device.

Figure 5:
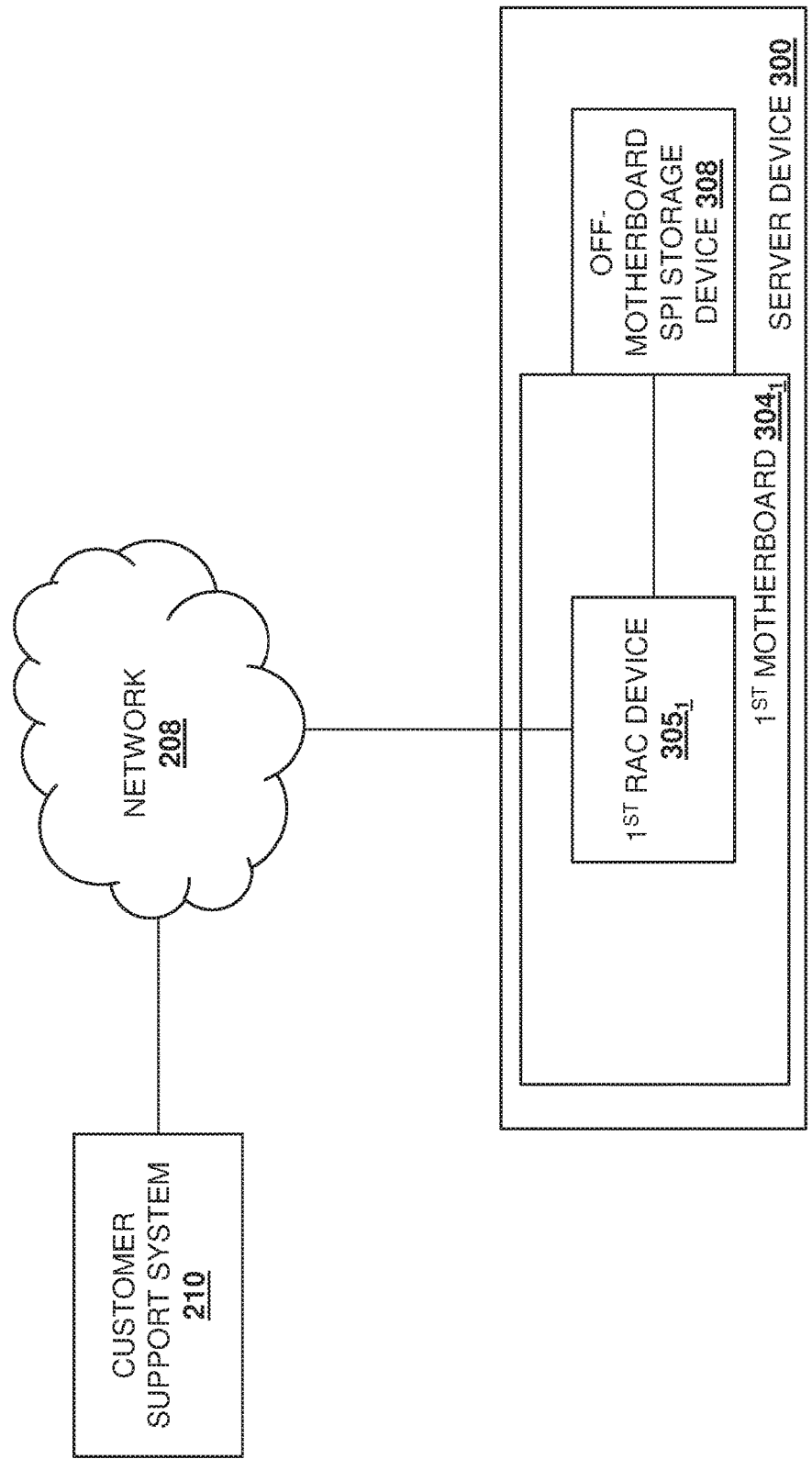
FIG. 5 is a schematic view illustrating an embodiment of a server device including a first motherboard and operating according to the method of FIG. 4.

The method 400 may begin at block 402 where a first remote access controller device on a first motherboard in a chassis determines that at least one log entry has been generated. In an embodiment, at or before block 402, the server device 300 may be provided including a first motherboard (e.g., the motherboard 304 of FIG. 3) in the chassis 302. For reference to the discussions below, FIG. 5 illustrates the server device 300 including a first motherboard $304_1$ having a first remote access controller device $305_1$, and one of skill in the art in possession of the present disclosure will recognize that the first motherboard $304_1$ and/or the first remote access controller device $305_1$ discussed below may include any or all of the features of the motherboard 304 and remote access controller device 305 discussed above with reference to FIG. 3 (i.e., the first motherboard $304_1$ and first remote access controller device $305_1$ may be coupled to the components of the server device 300 such as the non-volatile memory subsystem 310, the server subsystem(s) 312, the communications subsystem 314, and/or the off-motherboard SPI storage device 308 as illustrated and discussed with reference to FIG. 3. In an embodiment of block 402, the RAC engine 305a in the first remote access controller device $305_1$ may operate to determine that at least one log entry has been generated. In the specific examples discussed below, the at least one log entry is at least one server event log (SEL) entry has been generated in response to the operation of the server device 206a/300 and/or its components (e.g., the server subsystem(s) 312, the non-volatile memory subsystem 310, the communication subsystem 314, and/or any other components on or coupled to the first motherboard 304₁), the switch device 204 and/or its components (as communicated to the server device 206a/300 via a connection between the two), and/or any of the server devices 206b-d (as communicated to the server device 206a/300 via a connection between the two.)

For example, the one or more SEL entries may be generated at block 402 for any significant occurrence in the server device 206a/300 (or an application/program running on the server device), in the switch device 204, and/or in any or all of the server devices 206b-d, that requires a user of the server device to be notified or otherwise requires the entry to be added to the SEL. Furthermore, the one or more SEL entries may be classified by type (e.g., information events, warning events, error messages, success audit events, failure audit events, and/or other events known in the art), and may include a date of the event, a time of the event, a user logged in to the server device when the event occurred, an identifier for the server device, an event identifier that specifies the event type, a source of the event, and/or a variety of other SEL information known in the art. However, while the discussion below focuses on SEL entries, one of skill in the art in possession of the present disclosure will recognize that the storage and retrieval of other types of log entries may benefit from the teachings of the present disclosure and thus will fall within its scope as well.

In some embodiments, SEL entries may be generated and written to the RAC SPI storage device 305b (e.g., an "on-motherboard" storage device) on the first motherboard 304₁, and at block 402 the RAC engine 305a on the first motherboard 304₁ may monitor that RAC SPI storage device 305b to determine when the one or more SEL entries are written to it. For example, the RAC engine 305a in the server device 300 may execute an Intelligent Platform Management Interface (IPMI) command that adds a SEL entry (e.g., "NVRAM_SEL00.dat") to a location (e.g., "SA-SEL-bkup.path") on the RAC SPI storage device 305b on the first remote access controller device 305₁, and a service (e.g., "SA-SEL-bkup.service") provided by the RAC engine 305a on the first remote access controller device 305₁ may identify the writing of the SEL entry to that location. However, while a specific example of the determination of the generation of at least one log entry has been described, one of skill in the art in possession of the present disclosure will recognize that log entries may be generated in a variety of manners, and that generation may be detected in a variety of manners that will fall within the scope of the present disclosure as well.

The method 400 may then proceed to block 404 where the first remote access controller device automatically copies the at least one log entry to an off-motherboard storage device. In an embodiment, at block 404, the RAC engine 305a in the first remote access controller device 305₁ may operate to automatically copy the at least one SEL entry that was generated at block 402 to the off-motherboard SPI storage device 308 via the SPI 306. In a specific example, at block 404 the RAC engine 305a in the first remote access controller device 305₁ automatically copies the at least one SEL entry that was generated at block 402 to an rSPI (i.e., the off-motherboard SPI storage device 308) via the SPI 306, although other types of off-motherboard storage devices may fall within the scope of the present disclosure as well.

In some embodiments, at block 404, the RAC engine 305a in the first remote access controller device 305₁ may compare the at least one SEL entry that was generated at block 402 to SEL entries that may have previously been copied to the off-motherboard SPI storage device 308 in order to determine whether any of those at least one SEL entries have already been copied to the off-motherboard SPI storage device 308. As such, at block 404, the RAC engine 305a in the first remote access controller device 305₁ may only copy SEL entries to the off-motherboard SPI storage device 308 if those SEL entries do not already exists on the off-motherboard storage device 308.

In a specific example, in addition to, or in place of, the copying of the at least one SEL entry to the off-motherboard SPI storage device 308, the RAC engine 305a in the first remote access controller device 305₁ may copy the at least one SEL entry to the non-volatile memory subsystem 310 (e.g., to an NVDIMM device in the non-volatile memory subsystem 310.) One of skill in the art in possession of the present disclosure will recognize that NVDIMM devices are relatively expensive memory components that may not be available (or may not have available storage space) in all server devices, but if available may provide greatly increased storage capacity over the off-motherboard SPI storage device 308 (e.g., the rSPI) discussed above. As such, at block 404, a variety of information in addition to the at least one SEL entry may be written to the non-volatile memory subsystem/NVDIMM device. For example, at block 404, the RAC engine 305a in the first remote access controller device 305₁ may send a variety of data including the at least one SEL entry to a client (e.g., a host client) provided by one or more of the server subsystem(s) 312, and the client will then write that data to the non-volatile memory subsystem 310. In a specific example, an NVDIMM device may be provided in the non-volatile memory subsystem 310 for data collection in response to catastrophic events occurring in the first motherboard 304₁ or server device 300, and at block 404 the RAC engine 305a in an iDRAC on the first motherboard 304₁ may send a critical crash dump data collection (e.g., critical logs related to the system crash, SEL entries, iDRAC logs, iDRAC collection information, and/or other data) to an iDRAC service module (iSM) Remote Command Execution (RCE) client (e.g., via a USB/NIC interface between the iDRAC and the host.) The iSM RCE client will then write that data collection to the NVDIMM device, which may be backed up during an NVDIMM restore phase. While several examples of the automatic copying of SEL entries to off-motherboard storage devices have been described, one of skill in the art in possession of the present disclosure will recognize that log entries may be copied to off-motherboard storage devices in a variety of manners that will fall within the scope of the present disclosure as well.

Figure 6:
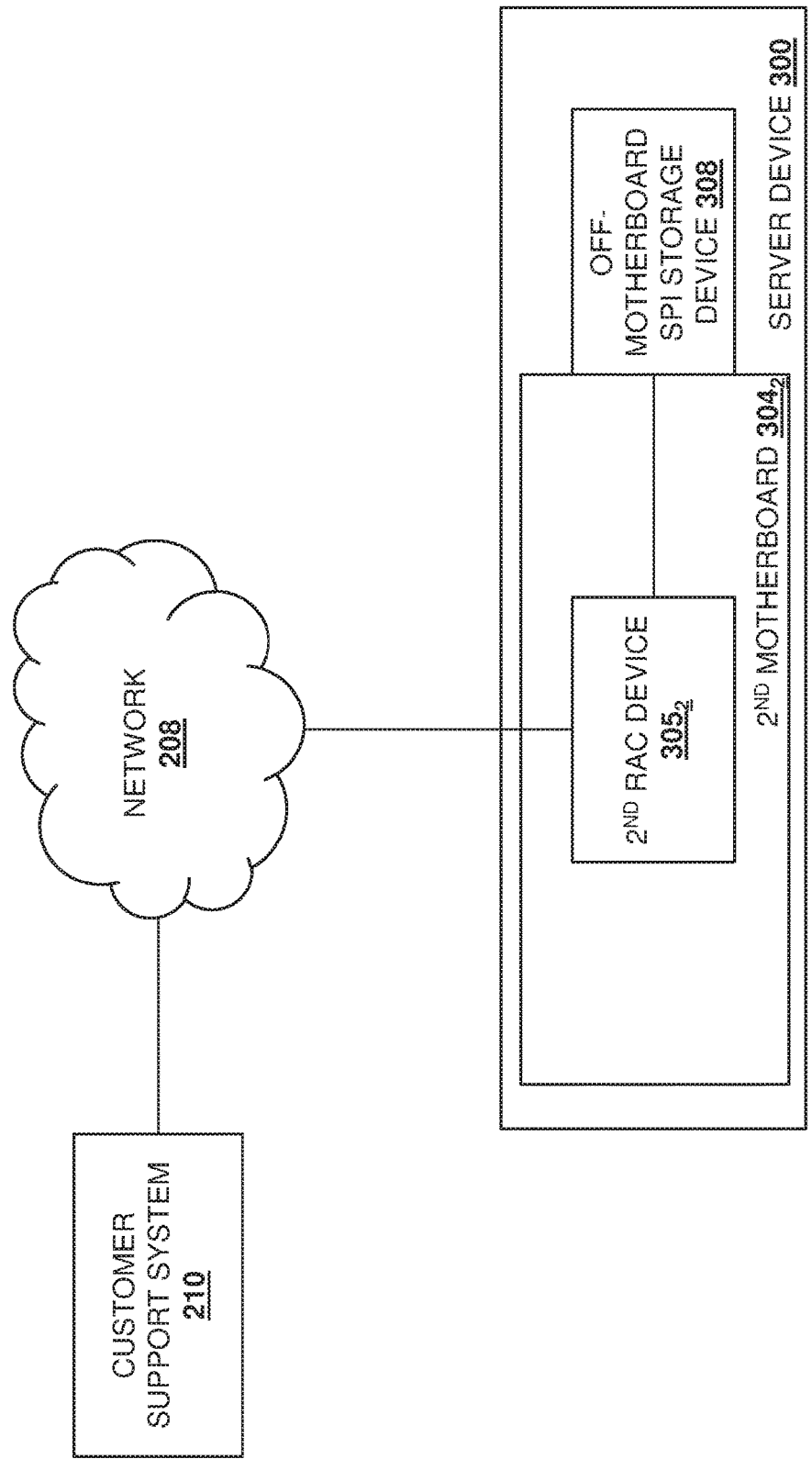
FIG. 6 is a schematic view illustrating an embodiment of the server device of FIG. 5 including a second motherboard and operating according to the method of FIG. 4.

The method 400 may then proceed to block 406 where a second motherboard replaces the first motherboard in the chassis. In an embodiment, at block 406, the first motherboard 304₁ may fail and/or otherwise become unavailable to a user of the server device 300, and may then be replaced with a second motherboard. For reference to the discussions below, FIG. 6 illustrates the server device 300 including a second motherboard 304₂ having a second remote access controller device 305₂, and one of skill in the art in possession of the present disclosure will recognize that the second motherboard 304₂ and/or the second remote access controller device 305₂ discussed below may include any or all of the features of the motherboard 304 discussed above with reference to FIG. 3. In an embodiment, failure of the first motherboard $304_1$ may be caused by the failure, malfunction, or other issue with the first motherboard $304_1$; the failure, malfunction, or other issue with one or more of the components on the first motherboard $304_1$; and/or due to any other issues known in the art to cause motherboard failures, motherboard malfunctions, and/or other motherboard issues. Furthermore, unavailability of the first motherboard $304_1$ may be caused by any of the motherboard failure, malfunction, or other issues discussed above, as well as failures, malfunctions, or other issues with systems and/or subsystems coupled to the first motherboard $304_1$. As such, failures, malfunctions, and/or other issues with the communication subsystem 314, the non-volatile memory subsystem 310, the server subsystem(s) 312, and/or the remote access controller device 305 on the first motherboard $304_1$ in the server device 206a/300, as well as failures, malfunctions, and/or other issues with the switch device 204 and/or any of the server devices 206b-d, may cause the first motherboard $304_1$ in the server device 206a/300 to become unavailable to a user of the server device 300.

As discussed below, in some cases the first motherboard $304_1$ may become unavailable without failing or otherwise needing to be replaced. While a few examples of reasons for replacing the first motherboard $304_1$ with the second motherboard $304_2$ have been described, one of skill in the art in possession of the present disclosure will recognize that a variety of issues can result in a motherboard being replaced in a chassis, and one of skill in the art in possession of the present disclosure will recognize that the replacement of a motherboard for those reasons will fall within the scope of the present disclosure as well. In an embodiment, the replacement of the first motherboard $304_1$ with the second motherboard $304_2$ have include disconnecting the off-motherboard SPI storage device 308 from the SPI 306 on the first motherboard $304_1$, as well as disconnecting any or all of the server subsystem(s) 312, the non-volatile memory subsystem 310, the communication subsystem 314, and/or any other subsystems in the chassis 300 from the first motherboard $304_1$. Similarly, the replacement of the first motherboard $304_1$ with the second motherboard $304_2$ have may include connecting the off-motherboard SPI storage device 308 to the SPI 306 on the second motherboard $304_2$, as well as connecting any or all of the server subsystem(s) 312, the non-volatile memory subsystem 310, the communication subsystem 314, and/or any other subsystems in the chassis 300 to the second motherboard $304_2$.

The method 400 may then proceed to block 408 where a second remote access controller device on the second motherboard retrieves at least one log entry that was copied to the off-motherboard storage by the first remote access controller device. In an embodiment, at block 408, the RAC engine 305a in the second remote access controller device $305_2$ may operate to retrieve the at least one SEL entry that was copied to the off-motherboard SPI storage device 308 at block 404. In a specific example, at block 408 and following the replacement of the first motherboard $304_1$ with the second motherboard $304_2$ in the chassis 302, the server device 300 may startup, boot, or otherwise initialize and, in response, the RAC engine 305a in the second remote access controller device $305_2$ may operate to automatically retrieve the at least one SEL entry that was copied to the rSPI (i.e., the off-motherboard SPI storage device 308) at block 404. In a specific example, in response to the startup, boot, or other initialization of the server device 300, a BIOS (e.g., provided on the second motherboard $304_2$) may send a restore communication (e.g., an IPMI command) to a SEL restore service provided by the RAC engine 305a in the second remote access controller device $305_2$ and, in response, the RAC engine 305a in the second remote access controller device $305_2$ may then operate to access the off-motherboard SPI storage device 308 to retrieve the at least one SEL entry that was copied to it at block 404.

The method 400 may then proceed to block 410 where the second remote access controller device sends the at least one log entry to a support device. In an embodiment, at block 410, the RAC engine 305a in the second remote access controller device $305_2$ may cause the at least one SEL entry that was retrieved from the off-motherboard SPI storage device 308 at block 408 to be sent through the network 208 to the customer support system 210 (e.g., in response to the restore commands received by the BIOS as discussed above.) In some embodiments, the RAC engine 305a in the second remote access controller device $305_2$ may send the at least one SEL entry that was retrieved from the off-motherboard SPI storage device 308 through the communication subsystem 314 on the second motherboard $304_2$ and over the network 208 to the customer support system 210. However, in some embodiments, the second remote access controller device $305_2$ may include a storage partition located in the on-motherboard SPI storage device 305b such as, for example, a vFLASH/MASER partition is provided on iDRACs available from DELL® Inc. of Round Rock, Tex., United States. At block 410, the RAC engine 305a in the second remote access controller device $305_2$ may copy the at least one SEL entry that was retrieved from the off-motherboard SPI storage device 308 at block 408 to the vFLASH/MASER partition as part of, for example, a support package that may include a variety of information that has been previously collected from the server device 300 in addition to the at least one SEL entry. Subsequently, the RAC engine 305a or other subsystems in the second remote access controller device $305_2$ may operate to send the support package over the network 208 to the customer support system 210.

The method 400 may then proceed to block 412 where the second remote access controller device erases the at least one log entry from the off-motherboard storage device. In an embodiment, at block 412, the RAC engine 305a in the second remote access controller device $305_2$ may cause any or all of the at least one SEL entry that is stored in the off-motherboard SPI storage device 308 to be erased. For example, following the retrieval and/or sending of the at least one SEL entry through the network 208 to the customer support device 210, the RAC engine 305a in the second remote access controller device $305_2$ may operate to wipe or otherwise erase the flash memory that provides the rSPI. As such, following block 412, the off-motherboard SPI storage device 308 is ensured available storage space so that the RAC engine 305a in the second remote access controller device $305_2$ on the second motherboard $304_2$ in may operate to perform blocks 402 and 404 of the method 400 in substantially the same manner as discussed above with the RAC engine 305a in the first remote access controller device $305_1$, on the first motherboard $304_1$.

One of skill in the art will recognize that each of the first motherboard $304_1$ and the second motherboard $304_2$ (as well as any other motherboards utilized according to the teachings of the present disclosure) may include substantially the same functionality discussed above in order to perform any of the functions discussed with respect to the first motherboard $304_1$ and the second motherboard $304_2$. Thus, a new motherboard may be provided to replace a failed/unavailable motherboard, and may immediately operate to retrieve previously stored log entries stored in the off-motherboard SPI storage device by the failed/unavailable motherboard, and then send those previously stored log entries to the customer support device. That new motherboard may then erase the off-motherboard SPI storage device, and then operate to determine when new log entries are generated, and automatically copy those new log entries to the off-motherboard SPI storage device (i.e., until that new motherboard fails or becomes unavailable and is replaced by yet another motherboard according to the teachings of the present disclosure.) One of skill in the art in possession of the present disclosure will recognize that the RAC engine 305a in the motherboards 304 of the present disclosure may remove or erase SEL entries from the off-motherboard SPI storage device 308 periodically, on any schedule, or otherwise, in order to ensure any desired storage space for the SEL entries as well as conventional information that is stored (or to-be stored) on the off-motherboard SPI storage device 308.

In examples where the RAC engine 305a in the first remote access controller device $305_1$ copies the at least one SEL entry and/or critical crash dump data collection (e.g., critical logs related to the system crash, SEL entries, iDRAC logs, iDRAC collection information, and/or other data) to the non-volatile memory subsystem 310 (e.g., to an NVDIMM device in the non-volatile memory subsystem 310), that data may be available in the event of the failure or unavailability of the first motherboard $304_1$ as well. For example, if the iSM RCE client is available following the motherboard failure/unavailability and motherboard replacement, it may operate to send the at least one SEL entry and/or critical crash dump data collection to the customer support system 210. Furthermore, even in situations where no part of the server device 300 (e.g., the iSM RCE client, the motherboard, the remote access controller device) is capable of communicating (e.g., the server device 300 cannot power up), the non-volatile memory subsystem 310 (e.g., the NVDIMM device in the non-volatile memory subsystem 310) may be removed from the server device 310 and provided in a properly operating device to retrieve the at least one SEL entry and/or critical crash dump data collection for analysis and/or sending to the customer support system 210.

Thus, systems and methods have been described that automatically back up of logs (e.g., server event logs (SELs)) generated while a first motherboard is in a chassis to an off-motherboard SPI storage device (e.g., an rSPI). In the event that first motherboard fails and/or becomes unavailable, the first motherboard may then be replaced with a second motherboard that retrieves those logs from the off-motherboard SPI storage device, and sends those logs through a network to a support device. One of skill in the art in possession of the present disclosure will recognize that providing customer support representatives the ability to view the SELs that were generated when that first motherboard was in the chassis (and up to the time that that first motherboard failed or became unavailable) provides an enhanced ability to analyze that failure and/or unavailability issue to determine the cause of that issues, and in some cases address and/or remedy that issue in the future. For example, it has been found that in many situations, motherboards may be replaced even when the cause of the motherboard unavailability is not a result of a failed motherboard (i.e., when that motherboard unavailability is caused by another subsystem coupled to that motherboard.) The use of the SEL entries generated, stored, and provided via the teachings of the present disclosure allow customer support representatives to quickly determine that a motherboard failure was not an issue, and possibly redeploy that motherboard quickly, rather than send it for testing to determine possible issues that may be very difficult to diagnose without associated SEL entries.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A log storage and retrieval system, comprising:
a first system;
an off-system storage device that is coupled to the first system;
a first management subsystem that is located on and coupled to the first system, wherein the first management subsystem is configured to:
determine that at least one log entry has been generated; and
copy the at least one log entry to the off-system storage device;
a second system that is configured to replace the first system and that is configured to couple to the off-system storage device when the second system replaces the first system; and
a second management subsystem that is located on and coupled to the second system, wherein the second management subsystem is configured to:
retrieve the at least one log entry that was copied to the off-system storage device by the first management subsystem; and
send the at least one log entry through a network to a support device.

2. The system of claim 1, wherein the first management subsystem includes an on-system storage device, and wherein the determining that the at least one log entry has been generated includes:
determining that the at least one log entry has been written to the on-system storage device.

3. The system of claim 1, wherein the log entry is a server event log (SEL) entry.

4. The system of claim 1, wherein the off-system storage device includes a flash storage device.

5. The system of claim 1, wherein the first management subsystem is configured to:
erase each at least one log entry from the off-system storage device in response to sending the at least one log entry through the network to the support device.

6. The system of claim 1, wherein the second management subsystem is configured to:
copy the at least one log entry that was retrieved from the off-system storage device to a support package; and
send the at least one log entry through the network to the support device as part of the support package.

7. The system of claim 1, wherein the second management subsystem is configured to:
retrieve the at least one log entry from the off-system storage device in response to an initialization following the replacement of the first system with the second system and the coupling of the second system to the off-system storage device.

8. An Information Handling System (IHS), comprising
a processing system; and
a memory system that is coupled to the processing system, wherein the memory system includes instructions that, when executed by the processing system, cause the processing system to provide a management engine that is configured to:

retrieve, subsequent to being connected to a first storage device, at least one previously stored log entry that was copied to the first storage device prior to the connection to the first storage device;

send the at least one previously stored log entry through a network to a support device;

determine, subsequent to sending the at least one previously stored log entry to the support device, that at least one current log entry has been generated; and copy the at least one current log entry to the first storage device.

9. The IHS of claim 8, further comprising:
a second storage device that is connected to the processing system, and wherein the determining that the at least one current log entry has been generated includes:
determining that the at least one current log entry has been written to the second storage device.

10. The IHS of claim 8, wherein the at least one previously stored log entry is a previously stored server event log (SEL) entry, and wherein the at least one current log entry is a current SEL entry.

11. The IHS of claim 8, wherein the first storage device includes a flash storage device.

12. The IHS of claim 8, wherein the management engine is configured to:
erase each at least one previously stored log entry from the first storage device in response to sending the at least one previously stored log entry through the network to the support device.

13. The IHS of claim 8, wherein the management engine is configured to:
copy the at least one previously stored log entry that was retrieved from the first storage device to a support package; and
send the at least one previously stored log entry through the network to the support device as part of the support package.

14. A method for log storage and retrieval, comprising:
retrieving, by a first management subsystem that is part of a first system and subsequent to being connected to an off-system storage device, at least one previously stored log entry that was automatically copied to the off-system storage device prior to the connection to the off-system storage device;

sending, by the first management subsystem, the at least one previously stored log entry through a network to a support device;

determining, by the first management subsystem subsequent to sending the at least one previously stored log entry to the support device, that at least one current log entry has been generated; and automatically copying, by the first management subsystem, the at least one current log entry to the off-system storage device.

15. The method of claim 14, wherein an on-system storage device is included with the first system and coupled to the first management subsystem, and wherein the determining that the at least one current log entry has been generated includes:
determining that the at least one current log entry has been written to the on-system storage device.

16. The method of claim 14, wherein the at least one previously stored log entry is a previously stored server event log (SEL) entry, and wherein the at least one current log entry is a current SEL entry.

17. The method of claim 14, wherein the off-system storage device includes a flash storage device.

18. The method of claim 14, further comprising:
erasing, by the first management subsystem, each at least one previously stored log entry from the off-system storage device in response to sending the at least one previously stored log entry through the network to the support device.

19. The method of claim 14, further comprising:
copying, by the first management subsystem, the at least one previously stored log entry that was retrieved from the off-system storage device to a support package; and
sending, by the first management subsystem, the at least one previously stored log entry through the network to the support device as part of the support package.

20. The method of claim 14, wherein the retrieving the at least one previously stored log entry includes:
automatically retrieving the at least one previously stored log entry from the off-system storage device in response to an initialization following a replacement of a second system with the first system and a coupling of the first system to the off-system storage device.

* * * * *